United States Patent
Lee et al.

(10) Patent No.: US 10,390,249 B2
(45) Date of Patent: Aug. 20, 2019

(54) METHOD FOR RECEIVING OR TRANSMITTING PILOT SIGNAL IN WIRELESS COMMUNICATION SYSTEM, AND APPARATUS THEREFOR

(71) Applicant: LG ELECTRONICS INC., Seoul (KR)

(72) Inventors: Hyunho Lee, Seoul (KR); Joonkui Ahn, Seoul (KR); Hanjun Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/556,600

(22) PCT Filed: Apr. 1, 2016

(86) PCT No.: PCT/KR2016/003423
§ 371 (c)(1),
(2) Date: Sep. 7, 2017

(87) PCT Pub. No.: WO2016/159722
PCT Pub. Date: Oct. 6, 2016

(65) Prior Publication Data
US 2018/0054750 A1  Feb. 22, 2018

Related U.S. Application Data

(60) Provisional application No. 62/142,491, filed on Apr. 3, 2015.

(51) Int. Cl.
*H04W 24/10* (2009.01)
*H04W 64/00* (2009.01)
(Continued)

(52) U.S. Cl.
CPC .......... *H04W 24/10* (2013.01); *H04W 64/00* (2013.01); *H04W 64/006* (2013.01);
(Continued)

(58) Field of Classification Search
CPC . H04W 24/10; H04W 64/006; H04W 74/002; H04W 74/0833; H04W 74/0808;
(Continued)

(56) References Cited

U.S. PATENT DOCUMENTS

| 2010/0227612 A1* | 9/2010 | Wang | H04L 5/0048 |
| | | | 455/434 |
| 2012/0122472 A1* | 5/2012 | Krishnamurthy | H04L 5/0053 |
| | | | 455/456.1 |

(Continued)

FOREIGN PATENT DOCUMENTS

| WO | 2011002188 | 1/2011 |
| WO | 2015037924 | 3/2015 |

OTHER PUBLICATIONS

PCT International Application No. PCT/KR2016/003423, Written Opinion of the International Searching Authority dated Jul. 7, 2016, 16 pages.

*Primary Examiner* — Dady Chery
(74) *Attorney, Agent, or Firm* — Lee Hong Degerman Kang Waimey

(57) ABSTRACT

In a method for receiving a pilot signal for determining a location in an unlicensed band in a wireless communication system according to one embodiment of the present invention, the method is executed by a terminal, and may comprises the steps of: receiving configuration information regarding a pilot signal for location determination which is transmitted from a section in which signal transmission without channel sensing is permitted within the unlicensed band; detecting the pilot signal for location determination using the configuration information regarding the pilot sig- (Continued)

nal for location determination, and measuring the same; and reporting the measurement result of the pilot signal for location determination to a network.

18 Claims, 8 Drawing Sheets

(51) Int. Cl.
*H04W 74/00* (2009.01)
*H04W 74/08* (2009.01)
*H04W 16/14* (2009.01)
*H04W 88/08* (2009.01)

(52) U.S. Cl.
CPC ..... *H04W 74/002* (2013.01); *H04W 74/0808* (2013.01); *H04W 74/0833* (2013.01); *H04W 16/14* (2013.01); *H04W 64/003* (2013.01); *H04W 88/085* (2013.01)

(58) Field of Classification Search
CPC ... H04W 64/00; H04W 88/085; H04W 16/14; H04W 64/003
See application file for complete search history.

(56) References Cited

U.S. PATENT DOCUMENTS

| | | | |
|---|---|---|---|
| 2013/0143502 A1* | 6/2013 | Kazmi | H04W 88/06 455/62 |
| 2014/0036853 A1* | 2/2014 | Kim | H04W 16/14 370/329 |
| 2014/0192735 A1 | 7/2014 | Sridharan et al. | |
| 2015/0156650 A1* | 6/2015 | Li | H04W 72/085 455/67.11 |
| 2016/0223641 A1* | 8/2016 | Cheng | G01S 5/0036 |

* cited by examiner

METHOD FOR RECEIVING OR TRANSMITTING PILOT SIGNAL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2016/003423, filed on Apr. 1, 2016, which claims the benefit of U.S. Provisional Application No. 62/142,491, filed on Apr. 3, 2015, the contents of which are all hereby incorporated by reference herein in their entirety.

TECHNICAL FIELD

The present invention relates to a wireless communication system, and more particularly, to a method of receiving or transmitting a pilot signal for determining a location in a wireless communication system and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE OF THE INVENTION

Technical Task

A technical task of the present invention is to provide a method of receiving or transmitting a pilot signal for determining a location in a wireless communication system and a relevant operation.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method for receiving a pilot signal for positioning, which is received by a terminal in an unlicensed band in a wireless communication system, includes receiving configuration information related to the pilot signal for positioning to be transmitted in a period for which signal transmission is permitted without channel sensing within the unlicensed band, detecting the pilot signal for positioning using the configuration information related to the pilot signal for positioning and performing measurement on the pilot signal, and reporting a measurement result of the pilot signal for positioning to a network.

Additionally or alternatively, the configuration information related to the pilot signal for determining the position may include information on an index of a subframe in which the pilot signal for positioning is transmitted, a transmission period of the pilot signal, a transmission period, and a length of a transmission burst in which the pilot signal is transmitted.

Additionally or alternatively, the configuration information related to the pilot signal for positioning may be transmitted in a part of the period for which signal transmission is permitted without channel sensing within the unlicensed band.

Additionally or alternatively, the pilot signal for determining the position may be transmitted in the remaining period except a period in which the configuration information has been transmitted among the period for which signal transmission is permitted without channel sensing within the unlicensed band.

Additionally or alternatively, the configuration information related to the pilot signal for positioning may be provided per a base station or a transmission point that transmits the pilot signal.

Additionally or alternatively, the configuration information related to the pilot signal for positioning may include information on a frequency band on which the pilot signal is transmitted.

Additionally or alternatively, the method may further include transmitting a request for transmitting the pilot signal for positioning in the period for which signal transmission is permitted without channel sensing within the unlicensed band to the network.

Additionally or alternatively, the request may include an identifier of a base station or a transmission point to transmit the pilot signal for positioning.

To further achieve these and other advantages and in accordance with the purpose of the present invention, according to a different embodiment, a terminal configured to receive a pilot signal for determining a position in an unlicensed band in a wireless communication system includes an radio frequency (RF) unit and a processor that controls the RF unit, wherein the processor controls the RF unit to receive configuration information related to the pilot signal for positioning to be transmitted in a period for which signal transmission is permitted without channel sensing within the unlicensed band, detects the pilot signal for positioning using the configuration information related to the pilot signal for positioning and perform measurement on the pilot signal, and reports a measurement result of the pilot signal for positioning to a network.

Additionally or alternatively, the configuration information related to the pilot signal for positioning may include information on an index of a subframe in which the pilot signal for positioning is transmitted, a transmission period of the pilot signal, a transmission offset, and a length of a transmission burst in which the pilot signal is transmitted.

Additionally or alternatively, the configuration information related to the pilot signal for positioning may be transmitted in a part of the period for which signal transmission is permitted without channel sensing within the unlicensed band.

Additionally or alternatively, the pilot signal for positioning may be transmitted in the remaining period except the period in which the configuration information has been transmitted among the period for which signal transmission is permitted without channel sensing within the unlicensed band.

Additionally or alternatively, the configuration information related to the pilot signal for positioning may be provided per a base station or a transmission point that transmits the pilot signal.

Additionally or alternatively, the configuration information related to the pilot signal for positioning may include information on a frequency band on which the pilot signal is transmitted.

Additionally or alternatively, the processor may transmit a request for transmitting the pilot signal for positioning in the period for which signal transmission is permitted without channel sensing within the unlicensed band to the network.

Additionally or alternatively, the request may include an identifier of a base station or a transmission point which transmits the pilot signal for positioning.

To further achieve these and other advantages and in accordance with the purpose of the present invention, according to a further different embodiment, a method for transmitting a pilot signal for positioning, which is transmitted by a base station or a transmission point in an unlicensed band in a wireless communication system, may include transmitting configuration information related to the pilot signal for positioning in a period for which signal transmission is permitted without channel sensing within the unlicensed band, transmitting the pilot signal for positioning according to the configuration information related to the pilot signal for positioning, and receiving a measurement result of the pilot signal for positioning.

To further achieve these and other advantages and in accordance with the purpose of the present invention, according to a further different embodiment, a base station configured to transmit a pilot signal for positioning in an unlicensed band in a wireless communication system includes an radio frequency (RF) unit and a processor that controls the RF unit, wherein the processor may control the RF unit to transmit configuration information related to the pilot signal for positioning in a period for which signal transmission is permitted without channel sensing within the unlicensed band, controls the RF unit to transmit the pilot signal for positioning according to the configuration information related to the pilot signal for positioning, controls the RF unit to receive a measurement result of the pilot signal for positioning.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to efficiently receive or transmit a pilot signal for determining a location in a wireless communication system and measure the pilot signal.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
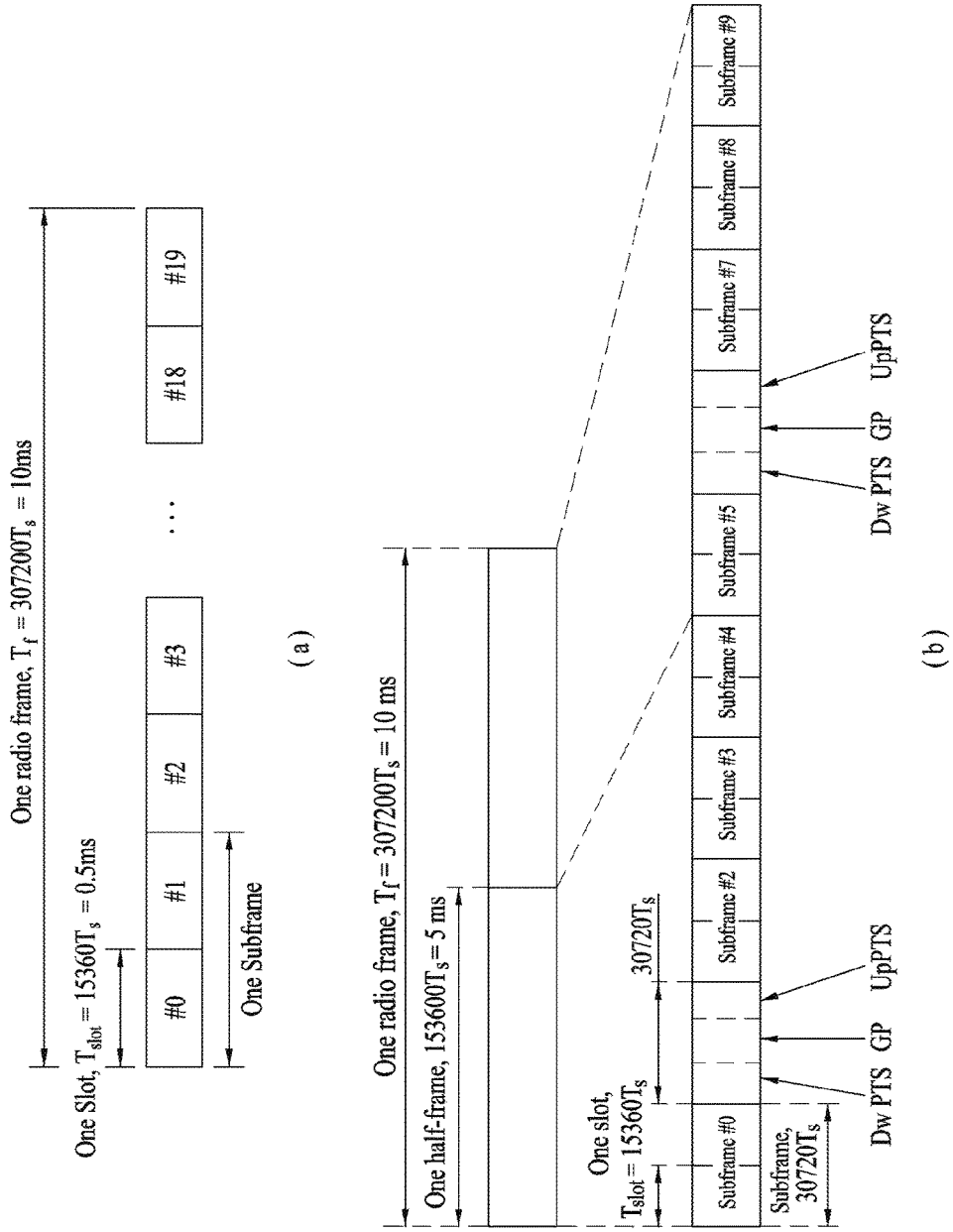
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe config- uration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
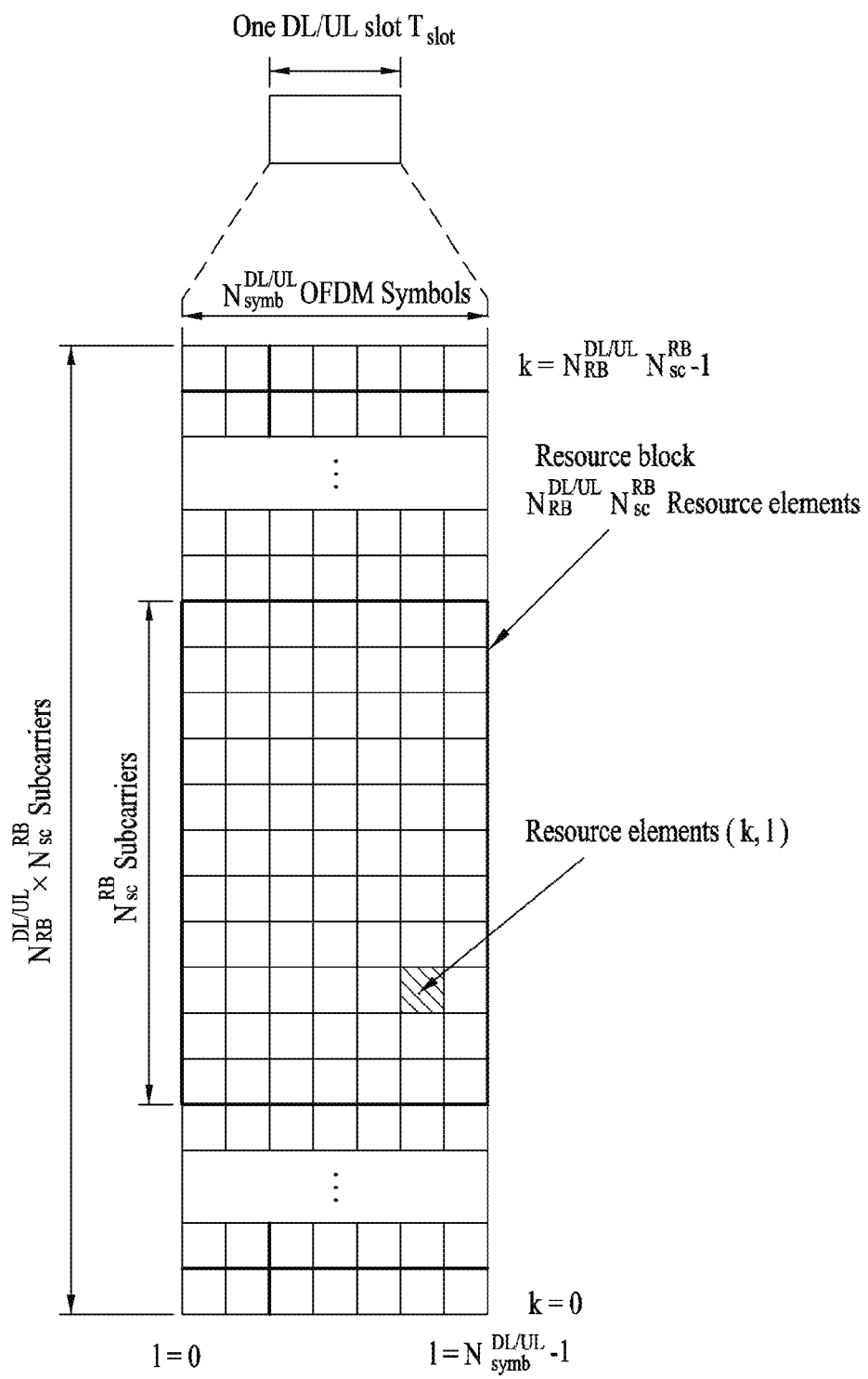
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
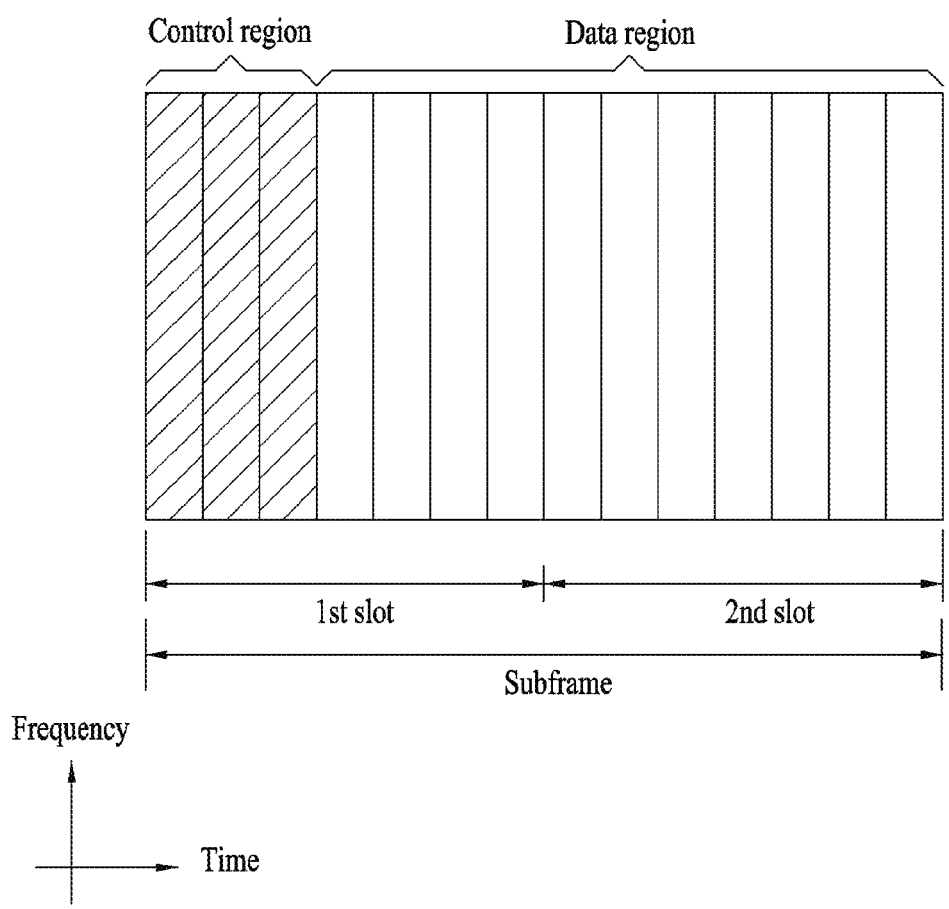
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space | | Number of PDCCH candidates $M^{(L)}$ |
|---|---|---|---|
| | Aggregation Level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
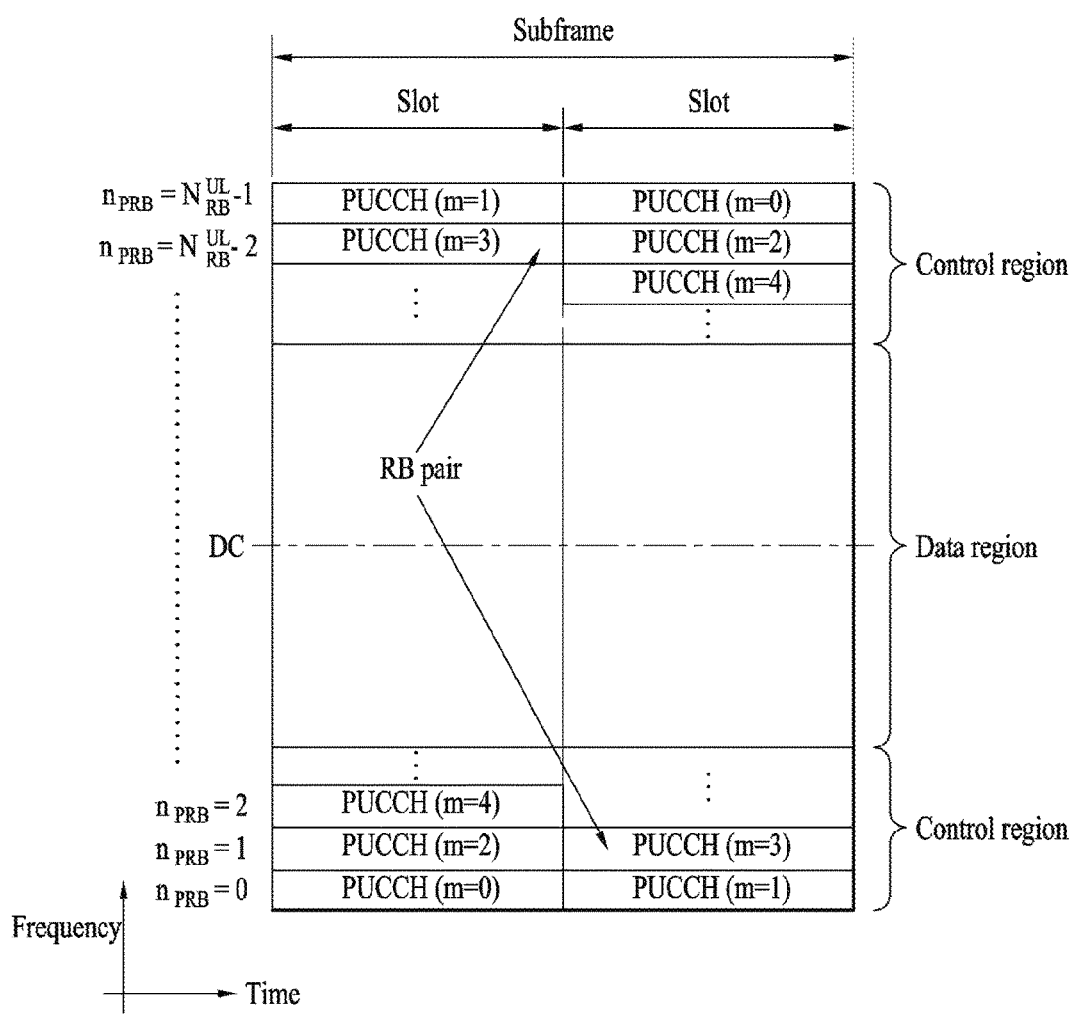
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Generally, in a cellular communication system, various methods for acquiring position information of a UE in a network are used. Representatively, a positioning scheme based on OTDOA (observed time difference of arrival) exists in the LTE system. According to the positioning scheme, the UE may be configured to receive PRS (positioning reference signal) transmission related information of eNBs from a higher layer signal, and may transmit a reference signal time difference (RSTD) which is a difference between a reception time of a PRS transmitted from a reference eNB and a reception time of a PRS transmitted from a neighboring eNB to a eNB or network by measuring PRS transmitted from cells in the periphery of the UE, and the network calculates a position of the UE by using RSTD and other information. In addition, other schemes such as an A-GNSS (Assisted Global Navigation Satellite System) positioning scheme, an E-CID (Enhanced Cell-ID) scheme, and a UTDOA (Uplink Time Difference of Arrival) exist, and various location-based services (for example, advertisements, position tracking, emergency communication means, etc.) may be used based on these positioning schemes.

[LTE Positioning Protocol]

In the LTE system, an LPP (LTE positioning protocol) has been defined to the OTDOA scheme, and notifies the UE of OTDOA-ProvideAssistanceData having the following configuration through IE (information element).

```
-- ASN1START
OTDOA-ProvideAssistanceData ::= SEQUENCE {
  otdoa-ReferenceCellInfoOTDOA-ReferenceCellInfo OPTIONAL,  --
Need ON
  otdoa-NeighbourCellInfo      OTDOA-NeighbourCellInfoList
OPTIONAL, -- Need ON
  otdoa-Error   OTDOA-Error OPTIONAL,   -- Need ON
  ...
}
-- ASN1STOP
```

In this case, OTDOA-ReferenceCellInfo means a cell which is a reference of RSTD measurement, and is configured as follows.

```
-- ASN1START
OTDOA-ReferenceCellInfo ::= SEQUENCE {
    physCellId      INTEGER (0..503),
    cellGlobalId    ECGI    OPTIONAL,   -- Need ON
    earfcnRef       ARFCN-ValueEUTRA OPTIONAL,   --Cond
NotSameAsServ0
    antennaPortConfig    ENUMERATED {ports1-or-2, ports4, ... }
OPTIONAL,       -- Cond NotSameAsServ1
    cpLength ENUMERATED { normal, extended, ... },
    prsInfo PRS-Info       OPTIONAL,   -- Cond PRS
    ...,
    [[ earfcnRef-v9a0     ARFCN-ValueEUTRA-v9a0 OPTIONAL   --
Cond NotSameAsServ2
    ]]
}
-- ASN1STOP
```

Meanwhile, OTDOA-NeighbourCellInfo means cells (for example, eNB or TP) which is a target for RSTD measurement, and may include information on maximum 24 neighboring cells per frequency layer with respect to maximum three frequency layers. That is, OTDOA-NeighbourCellInfo may notify the UE of information on a total of 3*24=72 cells.

```
-- ASN1START
OTDOA-NeighbourCellInfoList ::= SEQUENCE (SIZE
(1..maxFreqLayers)) OF OTDOA-NeighbourFreqInfo
OTDOA-NeighbourFreqInfo ::= SEQUENCE (SIZE (1..24)) OF
OTDOA-NeighbourCellInfoElement
OTDOA-NeighbourCellInfoElement ::= SEQUENCE {
    physCellId      INTEGER (0..503),
    cellGlobalId    ECGI OPTIONAL,   -- Need ON
    earfcn ARFCN-ValueEUTRA OPTIONAL,      --       Cond
NotSameAsRef0
    cpLength       ENUMERATED {normal, extended, ...}
OPTIONAL,       -- Cond NotSameAsRef1
    prsInfo PRS-Info       OPTIONAL,       -- Cond NotSameAsRef2
    antennaPortConfig    ENUMERATED {ports-1-or-2, ports-4, ...}
OPTIONAL,       -- Cond NotsameAsRef3
    slotNumberOffset    INTEGER (0..19)    OPTIONAL,   -- Cond
NotSameAsRef4
    prs-SubframeOffset  INTEGER (0..1279)  OPTIONAL,   --
Cond InterFreq
    expectedRSTD INTEGER (0..16383),
    expectedRSTD-Uncertainty     INTEGER (0..1023),
    ...,
    [[ earfcn-v9a0     ARFCN-ValueEUTRA-v9a0 OPTIONAL   --
Cond NotSameAsRef5
    ]]
}
    maxFreqLayers INTEGER ::= 3
-- ASN1STOP
```

In this case, PRS-Info which is IE included in OTDOA-ReferenceCellInfo and OTDOA-NeighbourCellInfo has PRS information, and is specifically configured, as follows, as PRS Bandwidth, PRS Configuration Index (IPRS), Number of Consecutive Downlink Subframes, and PRS Muting Information.

```
PRS-Info ::= SEQUENCE {
    prs-Bandwidth ENUMERATED { n6, n15, n25, n50, n75, n100, ... },
    prs-ConfigurationIndex INTEGER (0..4095),
    numDL-Frames ENUMERATED {sf-1, sf-2, sf-4, sf-6, ...},
    ...,
    prs-MutingInfo-r9        CHOICE {
        po2-r9    BIT STRING (SIZE(2)),
        po4-r9    BIT STRING (SIZE(4)),
        po8-r9    BIT STRING (SIZE(8)),
        po16-r9 BIT STRING (SIZE(16)),
        ...
    } OPTIONAL       -- Need OP
}
-- ASN1STOP
```

Figure 5:
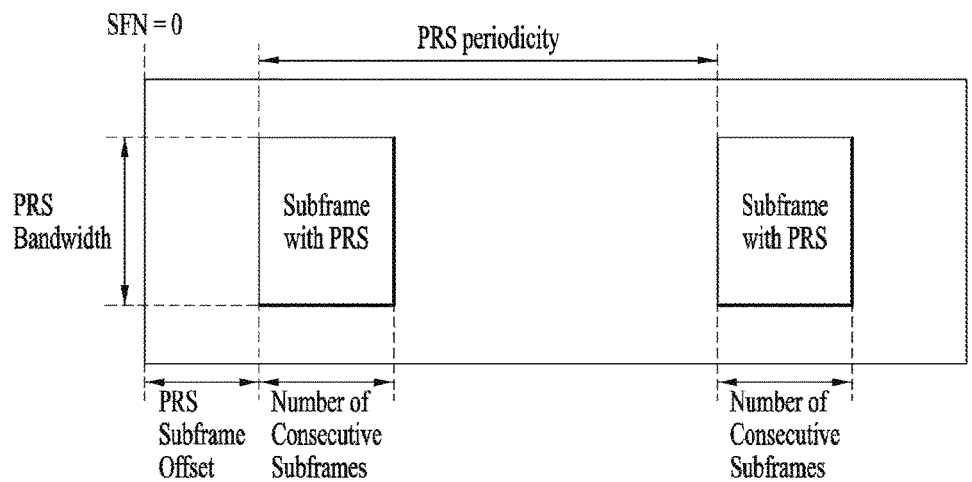
FIG. 5 is a diagram for a PRS transmission structure.

FIG. 5 illustrates a PRS transmission structure according to the above parameters.

At this time, PRS Periodicity and PRS Subframe Offset are determined in accordance with a value of PRS Configuration Index (IPRS), and their correlation is as follows.

TABLE 5

| PRS Configuration Index ($I_{PRS}$) | PRS Periodicity (subframes) | PRS Subframe Offset (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-23399 | 1280 | $I_{PRS}$ − 1120 |

[PRS (Positioning Reference Signal)]

Figure 6:
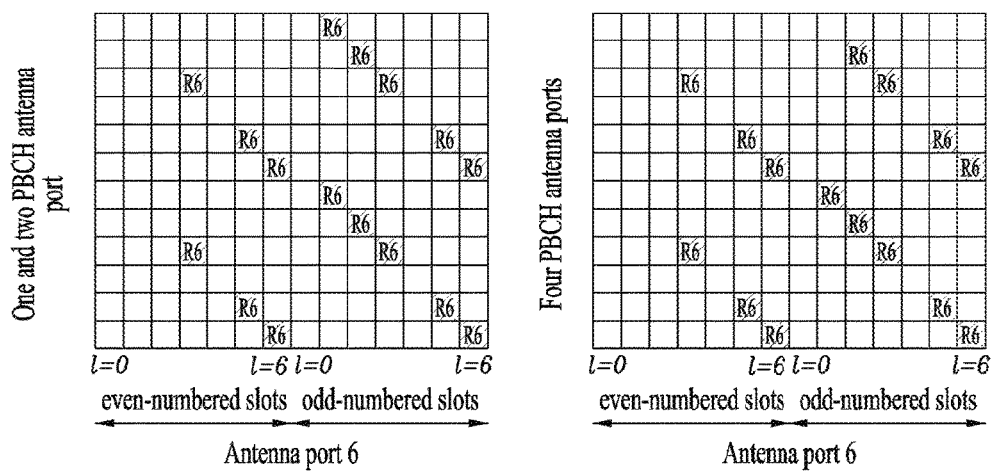
FIGS. 6 and 7 are diagrams for RE mapping of a PRS (positioning reference signal)
Figure 7:
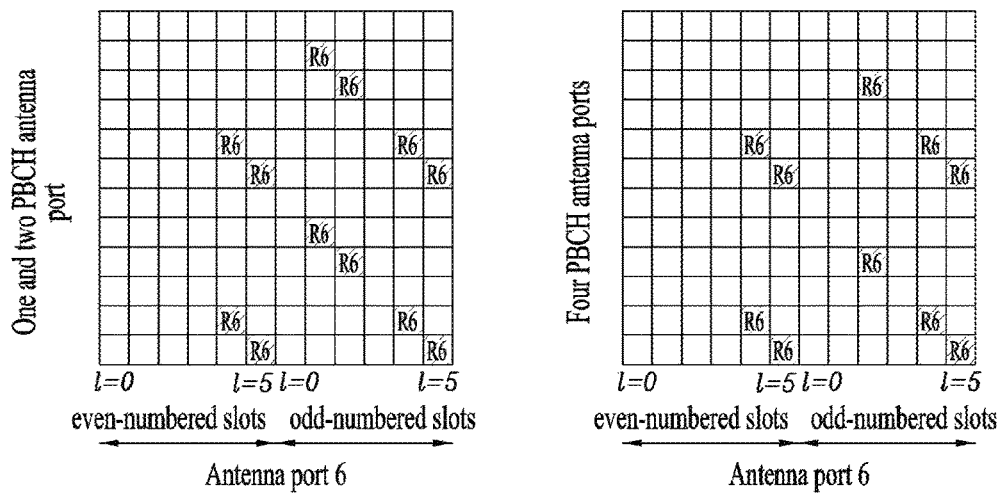

The PRS has a transmission occasion, that is, a positioning occasion at a period of 160, 320, 640, or 1280 ms, and may be transmitted for N DL subframes consecutive to the positioning occasion. In this case, N may have a value of 1, 2, 4 or 6. Although the PRS may be transmitted substantially at the positioning occasion, the PRS may be muted for inter-cell interference control cooperation. Information on such PRS muting is signaled to the UE as prs-MutingInfo. A transmission bandwidth of the PRS may be configured independently unlike a system bandwidth of a serving eNB, and is transmitted to a frequency band of 6, 15, 25, 50, 75 or 100 resource blocks (RBs). Transmission sequences of the PRS are generated by initializing a pseudo-random sequence generator for every OFDM symbol using a function of a slot index, an OFDM symbol index, a cyclic prefix (CP) type, and a cell ID. The generated transmission sequences of the PRS are mapped to resource elements (REs) depending on a normal CP or an extended CP as shown in FIG. 6 (normal CP) and FIG. 7 (extended CP). A position of the mapped REs may be shifted on the frequency axis, and a shift value is determined by a cell ID. The positions of the REs for transmission of the PRS shown in FIGS. 6 and 7 correspond to the case that the frequency shift is 0.

The UE receives designated configuration information on a list of PRSs to be searched from a position management server of a network to measure PRSs. The corresponding information includes PRS configuration information of a reference cell and PRS configuration information of neighboring cells. The configuration information of each PRS includes a generation cycle and offset of a positioning occasion, and the number of continuous DL subframes constituting one positioning occasion, cell ID used for generation of PRS sequences, a CP type, the number of CRS antenna ports considered at the time of PRS mapping, etc. In addition, the PRS configuration information of the neighboring cells includes a slot offset and a subframe offset of the neighboring cells and the reference cell, an expected RSTD, and a level of uncertainty of the expected RSTD to support determination of the UE when the UE determines a timing point and a level of time window used to search for the PRS to detect the PRS transmitted from the neighboring cell.

Meanwhile, the RSTD refers to a relative timing difference between an adjacent or neighboring cell j and a reference cell i. In other words, the RSTD may be expressed by $T_{subframeRxj} - T_{subframeRxi}$, wherein $T_{subframeRxj}$ refers to a timing point at which a UE starts to receive a specific subframe from the neighboring cell j, and $T_{subframeRxj}$ refers to a timing point at which a UE starts to receive a subframe, which is closest to the specific subframe received from the neighboring cell j in terms of time and corresponds to the specific subframe, from the reference cell i. A reference point for an observed subframe time difference is an antenna connector of the UE.

Although the aforementioned positioning schemes of the related art are already supported by the 3GPP UTRA and E-UTRAN standard (for example, (LTE Rel-9), higher accuracy is recently required for an in-building positioning scheme. That is, although the positioning schemes of the related art may commonly be applied to outdoor/indoor environments, in case of E-CID scheme, general positioning accuracy is known as 150 m in a non-LOS (NLOS) environment and as 50 m in a LOS environment. Also, the OTDOA scheme based on the PRS has a limit in a positioning error, which may exceed 100 m, due to an eNB synchronization error, a multipath propagation error, a quantization error in RSTD measurement of a UE, and a timing offset estimation error. Also, since a GNSS receiver is required in case of the A-GNSS scheme, the A-GNSS scheme has a limit in complexity and battery consumption, and has a restriction in using in-building positioning.

[LTE (LTE-U) in Unlicensed Band]

Recently, with the advent of a smart device, data traffic is considerably increasing. As a result, a next generation wireless communication system such as 3GPP LTE-A is trying to find ways to efficiently utilizing a limited frequency band. In particular, the next generation wireless communication system considers managing a cellular network on such an unlicensed band as 2.4 GHz or 5 GHz. The unlicensed band regulates each of communication nodes to perform wireless transmission and reception based on an LBT operation such as CCA (clear channel assessment) and the like.

Figure 8:
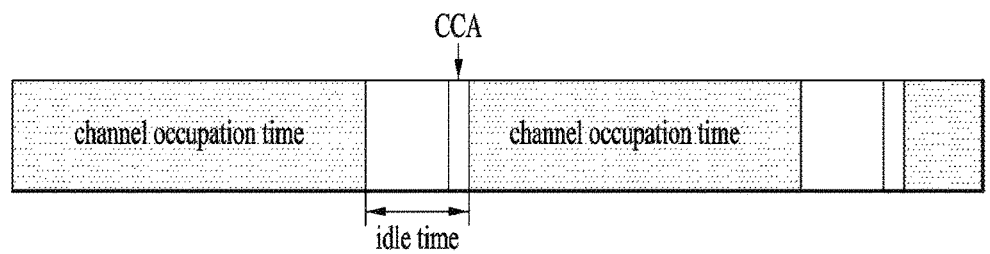
FIG. 8 is a diagram for an example of an LBT (listen before talk)-based channel access operation according to a FBE (frame based equipment)

For example, regulation of Europe illustrates two types of LBT-based channel access operation respectively referred to as FBE (frame based equipment) and LBE (load based equipment). The FBE configures a single frame using channel occupancy time (e.g., 1~10 ms) corresponding to time capable of maintaining transmission when a communication node succeeds in accessing a channel and idle time corresponding to the minimum 5% of the channel occupancy time. The CCA is defined as an operation of observing a channel for at least 20 μs of the last part of the idle time. In this case, a communication node periodically performs the CCA in a unit of the frame. If a channel is unoccupied, the communication node transmits data during the channel occupancy time. If a channel is occupied, the communication node waits until a CCA slot of a next period while postponing transmission. FIG. 8 shows an example of the FBE operation.

Figure 9:
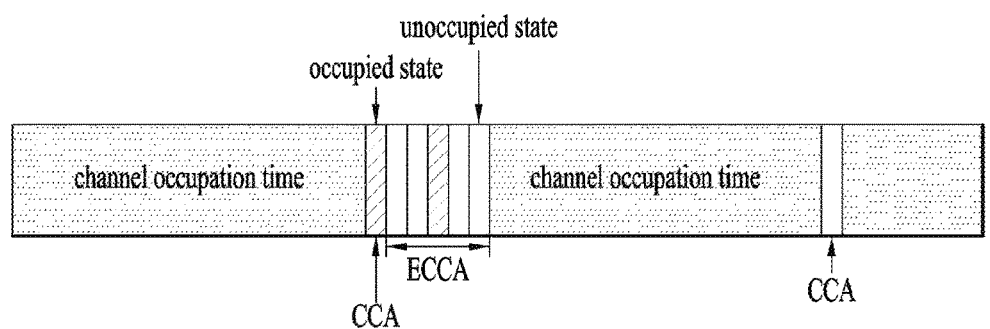
FIG. 9 is a diagram for an example of an LBT (listen before talk)-based channel access operation according to an LBE (load based equipment)

Meanwhile, in case of the LBE, a communication node configures a value of q∈{4, 5, . . . , 32} first and performs CCA on a single slot. If a channel is unoccupied in the first CCA slot, the communication node can transmit data by securing channel occupancy time as much as a length of ($^{13}/_{32}$)q ms. If a channel is occupied in the first CCA slot, the communication node randomly selects a value of N∈{1, 2, . . . , q}, stores the selected value as an initial value of a counter, and senses a channel state in a unit of a CCA slot. If a channel is unoccupied in a specific CCA slot, the communication node reduces the value stored in the counter by 1. If the value stored in the counter becomes 0, a user equipment (UE) can transmit data with channel occupancy time as much as a length of ($^{13}/_{32}$)q ms. FIG. 9 shows an example of the LBE operation.

In the example, an occupied state of a channel or an unoccupied state of the channel can be determined based on whether or not reception power exceeds a prescribed threshold in a CCA slot. For example, according to the Wi-Fi standard (e.g., 801.11ac), a CCA threshold is regulated by −62 dBm and −82 dBm for a non-Wi-Fi signal and a Wi-Fi signal, respectively. In particular, if a signal rather than a Wi-Fi signal is received with power equal to or greater than −62 dBm, an STA (station) or an AP (access point) does not perform signal transmission to avoid interference occurrence. Meanwhile, a wireless communication system such as 3GPP LTE-A, and the like, considers a method of combining a cell operating on a licensed band (hereinafter, L-cell) and a cell operating on an unlicensed band (hereinafter, U-cell) with each other using a CA (carrier aggregation) technique and a method of performing LBT-based DL/UL transmission in the U-cell.

Meanwhile, although the aforementioned legacy positioning schemes are already supported by 3GPP UTRA and E-UTRA standard (e.g., LTE Rel-9), it is necessary to have an enhanced positioning scheme to have a higher accuracy for in-building positioning. In particular, although the legacy positioning schemes correspond to techniques capable of being commonly applied to outdoor/indoor environment, in case of E-CID scheme, a general positioning accuracy is known as 150 m and 50 m in NLOS environment and LOS environment, respectively. Moreover, the OTDOA scheme based on a PRS has such a critical point as a positioning error capable of exceeding 100 m due to an eNB synchronization error, an error generated by multipath propagation, an RSTD measurement quantization error of a UE, timing offset estimation error, and the like. In case of A-GNSS scheme, since the A-GNSS scheme requires a GNSS receiver, this scheme has a critical point in complexity and battery consumption. This scheme has a restriction on in-building positioning.

Basically, the present invention considers a method for an eNB to calculate location information of a UE in a manner that a cellular network transmits a specific pilot signal to the UE, the UE calculates a positioning-related estimation value using a specific positioning scheme by measuring the pilot signal (e.g., reporting OTDOA and RSTD estimation value), and the UE reports the calculated value to the eNB. For example, the specific pilot signal may have a form of a specific reference signal capable of being separately identified according to an eNB/TP (transmission point).

In the following, although an operation of an LTE system is explained as a specific embodiment of the present invention, the operation of the present invention can be extensively applied to a random wireless communication system that performs a positioning-related measurement and reporting operation by receiving a downlink pilot signal and estimates a location of a UE via the pilot signal.

An LBT-related regulation is defined according to a country or a region and can be configured by different contents. For example, according to the regulation of EU (European Union), a signal between 2.5 ms and 50 ms can be transmitted without a separate CCA procedure.

Hence, it may be able to configure a pilot signal for measuring a position to be transmitted without a separate CCA procedure in a specific time period of an unlicensed band. In this case, the specific time period can be implicitly indicated via such information as a period/offset/burst length, can be indicated via explicit signaling, or can be provided to a UE using a higher layer signal (or a dynamic signal). A subframe index corresponding to the time period for which the pilot signal is transmitted or the information such as the period/offset/burst length for indicating the time period can be provided to a UE via signaling. In this case, the information can be independently provided to the UE according to an eNB/TP.

In order to transmit the pilot signal for measuring a position during the specific time period of the unlicensed band, it may be able to provide all or a part of information including a CP length, an antenna port, a scrambling ID (e.g., a physical layer cell ID (PCID)) necessary for generating a sequence, a frequency band to be transmitted, RE mapping, and the like to a UE via signaling. Or, similar to what is configured for transmitting a PRS in a licensed band, it may be able to determine to transmit a pilot signal in an unlicensed band in advance and it may signal different information only. In this case, the information can be independently provided according to an eNB/TP.

It may be able to configure each eNB to transmit the pilot signal in a predefined specific time period irrespective of whether or not channel occupation time is configured. The pilot signal may correspond to such a reference signal as a PRS, a CRS, and the like specified in LTE standard. However, it is apparent that the pilot signal can be extended to a general pilot signal which is designed and transmitted for positioning-related measurement of a UE.

A UE detects a pilot signal in a time/frequency section configured to transmit the pilot signal without a separate CCA procedure in an unlicensed band to perform positioning-related measurement and can report the measurement to a network. For example, the UE can detect a pilot signal during a time/frequency section configured to transmit the pilot signal from each eNB/TP without a separate CCS procedure in an unlicensed band and measure TOA (time of arrival) on the pilot signal. Or, the UE can measure and report a value such as an average power level.

According to one embodiment of the present invention, it may be able to configure a time resource in which a pilot signal is transmitted as follows in consideration of environment in which the pilot signal is transmitted without a separate CCA procedure during maximum 2.5 ms in an unlicensed band. For clarity, a time period for which a signal is transmitted without a separate CCA procedure is referred to as an SCS (short control signal) period.

It may be able to transmit a pilot signal (e.g., a PRS, a CRS) for performing positioning-related measurement at all timings (e.g., OFDM symbols) within the SCS period in a manner of being mapped.

Having received information on a subframe index corresponding to a time period for which a pilot signal is transmitted or information on a period/offset/burst length indicating the subframe index, a UE detects the pilot signal in the time period, performs positioning-related measurement (e.g., TOA, average power level, etc.), and can report a measurement result to a network.

When an SCS period ranges from 0 to T, it may inform a UE that a predefined specific signal is transmitted at the first partial timing ranging from 0 to T1 (T1<T) and a pilot signal for performing positioning-related measurement is transmitted at timing ranging from T1 to T in a manner of being mapped to the specific signal. The UE detects the pilot signal through the specific signal at the timing ranging from T1 to T, performs the positioning-related measurement, and reports a measurement result to a network.

Meanwhile, although a pilot signal for performing positioning-related measurement is not transmitted within an SCS period, if a specific signal is transmitted within the SCS period, it may be able to inform a UE of a time/frequency resource in which a PRS is to be transmitted via the specific signal. For example, a network or an eNB/TP informs a UE of information on a subframe corresponding to the start of a positioning occasion, a bust length, and the like within an SCS period via signaling. If the corresponding time period is configured as channel occupation time, the eNB/TP can transmit a pilot signal. Or, although the time period is not configured as channel occupation time, if a burst length is equal to or less than 2.5 ms, the eNB/TP can transmit a pilot signal. The UE detects the pilot signal in the time period, performs positioning-related measurement, and may be able to report a measurement result to a network.

The network or the eNB/TP can provide the UE with information on a frequency band on which a pilot signal is transmitted via the signaling within the SCS period. For example, the network or the eNB/TP can provide the UE with information on a subframe corresponding to the start of a positioning occasion, a burst length, and the like via signaling within the SCS period with respect to each frequency band. The UE detects a pilot signal in a time period indicated for each frequency band, performs positioning-related measurement, and can report a measurement result to a network.

And, if a pilot signal is transmitted using a sequence for the pilot signal in continuous frequency bands according to a continuous CA scheme, information on the frequency bands can be provided to a UE. The UE detects the pilot signal with respect to the frequency bands, performs positioning-related measurement, and can report a measurement result to a network.

In order to increase accuracy of positioning performance, it may be preferable for a UE to utilize measurement in an unlicensed band in addition to measurement in a licensed band. In this view point, a UE may ask a specific eNB to transmit a pilot signal without a separate CCA procedure in an unlicensed band. In this case, the UE may also ask the eNB to transmit a signal for an eNB identifier indicating an eNB from which the pilot signal is transmitted.

Having received the request from the UE, the network configures the SCS period and may be then able to transmit a pilot signal in the SCS period. Or, the network transmits a specific signal in the SCS period to indicate a frequency/time resource in which a pilot signal is transmitted and may be able to transmit a pilot signal. Or, the network may transmit a pilot signal after prescribed time elapsed from the timing at which the request of the UE is received according to a predetermined rule and may set a time difference between the timing at which the request is received and the timing at which the pilot signal is transmitted to the UE using a higher layer signal.

Figure 10:
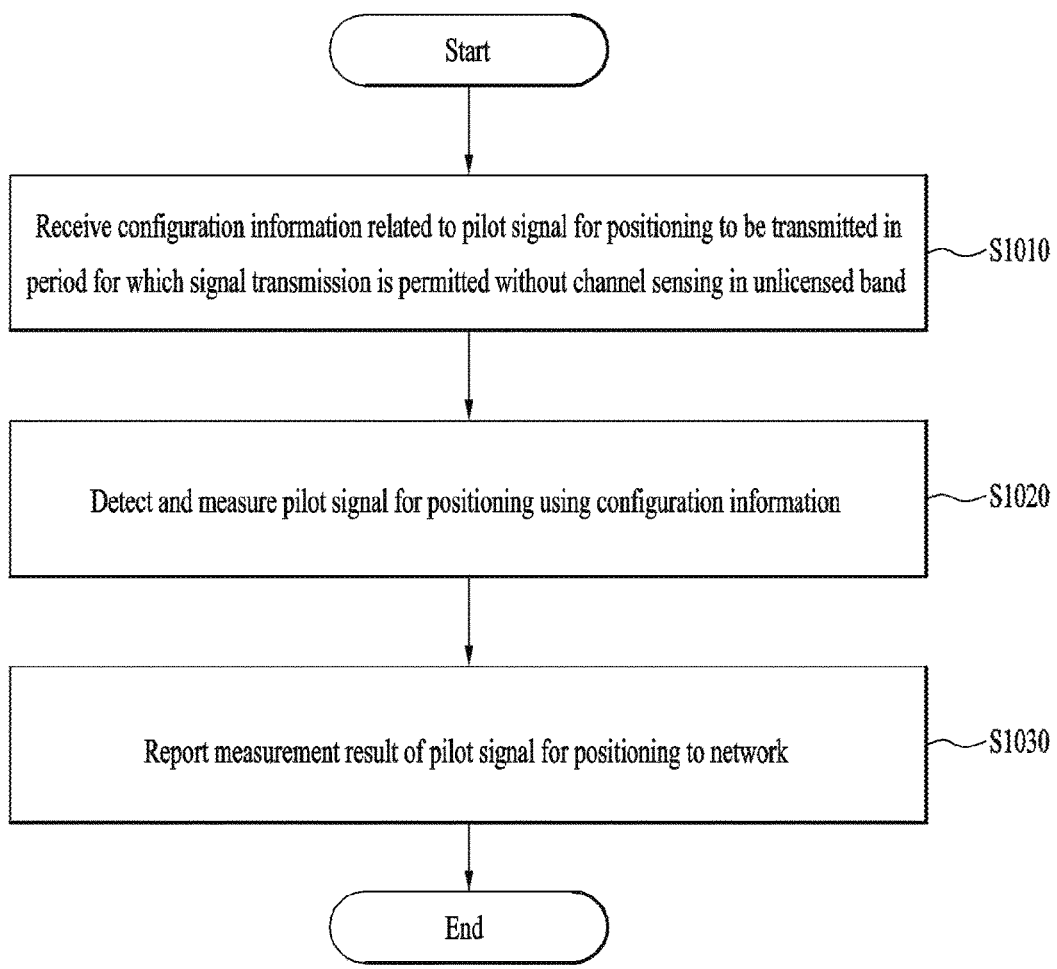
FIG. 10 is a flowchart for an operation according to an embodiment of the present invention.

FIG. 10 is a flowchart for an operation according to an embodiment of the present invention.

FIG. 10 shows a method of receiving a pilot signal for determining a position in an unlicensed and in a wireless communication system. The method can be performed by a terminal.

The terminal can receive pilot signal-related configuration information, which is transmitted in a period for which signal transmission is permitted without channel sensing in the unlicensed band [S1010]. The terminal detects a pilot signal for determining a position using the pilot signal-related configuration information and can perform measurement on the pilot signal [S1020]. The terminal can report a measurement result of the pilot signal to a network [S1030].

The pilot signal-related configuration information can include information on a subframe index in which the pilot signal is transmitted, a transmission interval of the pilot signal, a transmission offset, and a length of a transmission burst in which the pilot signal is transmitted. The pilot signal-related configuration information can be provided according to an eNB or a transmission point that transmits the pilot signal. And, the pilot signal-related configuration information can include information on a frequency band on which the pilot signal is transmitted.

And, the pilot signal-related configuration information can be transmitted in a partial period among a period for which signal transmission is permitted without channel sensing within the unlicensed band.

And, the pilot signal-related configuration information can be transmitted in the remaining period except a period in which the configuration information is transmitted among the period for which signal transmission is permitted without channel sensing within the unlicensed band.

The terminal can transmit a request for transmitting a pilot signal for determining a position in the period for which signal transmission is permitted without channel sensing within the unlicensed band to the network.

The request can include an identifier of an eNB or a transmission point that transmits the pilot signal.

In the foregoing description, the embodiments of the present invention have been briefly explained with reference to FIG. 10. An embodiment related to FIG. 10 can alternatively or additionally include at least a part of the aforementioned embodiment(s).

Figure 11:
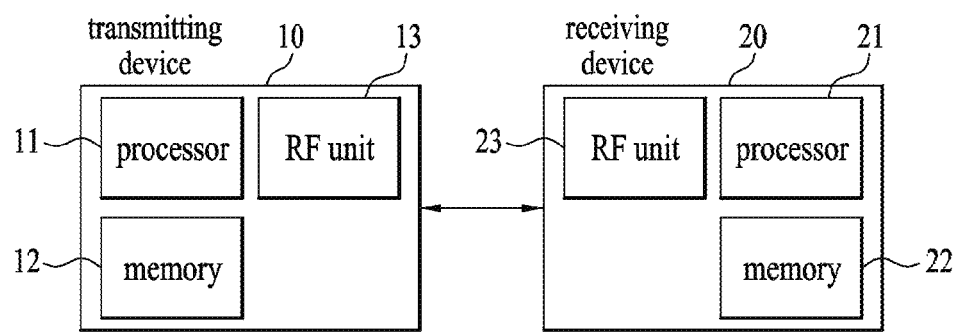
FIG. 11 is a block diagram of a device for implementing embodiment(s) of the present invention.

FIG. 11 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

What is claimed is:

1. A method for receiving a pilot signal for positioning, which is received by a terminal in an unlicensed band in a wireless communication system, the method comprising:
    receiving configuration information related to the pilot signal in a first part of a predetermined period, the predetermined period being a period during which signal transmission in the unlicensed band is permitted without channel sensing;
    based on the configuration information, detecting the pilot signal for positioning in a second part of the predetermined period and performing measurement on the pilot signal; and
    reporting a measurement result of the pilot signal for positioning to a network.

2. The method of claim 1, wherein the configuration information related to the pilot signal for positioning includes information on an index of a subframe in which the pilot signal for positioning is transmitted, a transmission period of the pilot signal, a transmission offset, and a length of a transmission burst in which the pilot signal is transmitted.

3. The method of claim 1, wherein the configuration information related to the pilot signal for positioning is provided per a base station or a transmission point that transmits the pilot signal.

4. The method of claim 1, wherein the configuration information related to the pilot signal for positioning includes information on a frequency band on which the pilot signal is transmitted.

5. The method of claim 1, further comprising transmitting a request for transmitting the pilot signal for positioning in the period for which signal transmission is permitted without channel sensing within the unlicensed band to the network.

6. The method of claim 5, wherein the request includes an identifier of a base station or a transmission point which transmits the pilot signal for positioning.

7. The method of claim 1, wherein the second part of the predetermined period follows the first part of the predetermined period.

8. A terminal configured to receive a pilot signal for determining a position in an unlicensed band in a wireless communication system, the terminal comprising:
    a receiver and a transmitter; and
    a processor that controls the receiver and the transmitter, wherein the processor:
        controls the receiver to receive configuration information related to the pilot signal in a first part of a predetermined period, the predetermined period being a period during which signal transmission in the unlicensed band is permitted without channel sensing,
        based on the configuration information, detects the pilot signal in a second part of the predetermined period and performing measurement on the pilot signal, and
        controls the transmitter to report a measurement result of the pilot signal for positioning to a network.

9. The terminal of claim 8, wherein the configuration information related to the pilot signal for positioning includes information on an index of a subframe in which the pilot signal for positioning is transmitted, a transmission period of the pilot signal, a transmission offset, and a length of a transmission burst in which the pilot signal is transmitted.

10. The terminal of claim 8, wherein the configuration information related to the pilot signal for positioning is provided per a base station or a transmission point that transmits the pilot signal.

11. The terminal of claim 8, wherein the configuration information related to the pilot signal for positioning includes information on a frequency band on which the pilot signal is transmitted.

12. The terminal of claim 8, wherein the processor further transmits a request for transmitting the pilot signal for positioning in the period for which signal transmission is permitted without channel sensing within the unlicensed band to the network.

13. The terminal of claim 12, wherein the request includes an identifier of a base station or a transmission point which transmits the pilot signal for positioning.

14. The terminal of claim 8, wherein the second part of the predetermined period follows the first part of the predetermined period.

15. A method for transmitting a pilot signal for determining a position, which is transmitted by a base station or a transmission point in an unlicensed band in a wireless communication system, the method comprising:
    transmitting configuration information related to the pilot signal for positioning in a first part of a predetermined period, the predetermined period being a period during which signal transmission in the unlicensed band is permitted without channel sensing;
    based on the configuration information, transmitting the pilot signal in a second part of the predetermined period; and
    receiving a measurement result of the pilot signal for positioning.

16. The method of claim 15, wherein the second part of the predetermined period follows the first part of the predetermined period.

17. A base station configured to transmit a pilot signal for positioning in an unlicensed band in a wireless communication system, the base station comprising:
    a receiver and a transmitter; and
    a processor that controls the receiver and the transmitter, wherein the processor:
        controls the transmitter to transmit configuration information related to the pilot signal in a first part of a predetermined period, the predetermined period being a period during which signal transmission in the unlicensed band is permitted without channel sensing,
        based on the configuration information, controls the transmitter to transmit the pilot signal in a second part of the predetermined period, and
        controls the receiver to receive a measurement result of the pilot signal for positioning.

18. The base station of claim 17, wherein the second part of the predetermined period follows the first part of the predetermined period.

* * * * *